US009799436B2

(12) United States Patent
Lee

(10) Patent No.: US 9,799,436 B2
(45) Date of Patent: Oct. 24, 2017

(54) MAGNETIC ATTRACTION-FIXING ASSEMBLY, TWO-PIECE APPARATUS, AND ROTATING SUPPORT STRUCTURE FOR A PORTABLE DEVICE HAVING THE MAGNETIC ATTRACTION-FIXING ASSEMBLY

(71) Applicant: Bing-Zhang Lee, Kaohsiung (TW)

(72) Inventor: Bing-Zhang Lee, Kaohsiung (TW)

( * ) Notice: Subject to any disclaimer, the term of this patent is extended or adjusted under 35 U.S.C. 154(b) by 0 days.

(21) Appl. No.: 14/975,870

(22) Filed: Dec. 21, 2015

(65) Prior Publication Data

US 2016/0125988 A1 May 5, 2016

Related U.S. Application Data

(63) Continuation-in-part of application No. 14/533,169, filed on Nov. 5, 2014, now abandoned.

(51) Int. Cl.
*F16M 11/00* (2006.01)
*H01F 7/02* (2006.01)

(52) U.S. Cl.
CPC ........... *H01F 7/021* (2013.01); *H01F 7/0221* (2013.01); *H01F 7/0263* (2013.01)

(58) Field of Classification Search
CPC .... Y10T 24/32; Y10T 29/49826; Y10T 29/11; Y10T 24/1959; Y10T 16/5401; Y10T 408/554; Y10T 428/325; Y10T 70/7057; Y10T 74/125; F16B 2001/0035; Y10S 211/01; Y10S 206/818; Y10S 52/04; Y10S 403/00
USPC ......... 248/371, 454, 455, 460, 441.1, 206.5; 24/303
See application file for complete search history.

(56) References Cited

U.S. PATENT DOCUMENTS

| | | | | | |
|---|---|---|---|---|---|
| 4,779,314 | A * | 10/1988 | Aoki | A41F 1/002 | 24/303 |
| 7,396,235 | B2 * | 7/2008 | De Wilde | B60R 11/02 | 248/316.4 |
| 7,441,358 | B1 * | 10/2008 | Ngan | G09F 1/10 | 281/33 |
| 7,582,828 | B2 * | 9/2009 | Ryan | H05K 5/0204 | 174/481 |
| 8,978,213 | B2 * | 3/2015 | Hayton | A44B 11/06 | 24/303 |
| 9,131,756 | B2 * | 9/2015 | Hurst | A45C 13/1069 | |
| 2006/0086873 | A1 * | 4/2006 | Chen | B60R 11/02 | 248/206.5 |

(Continued)

*Primary Examiner* — Steven Marsh
(74) *Attorney, Agent, or Firm* — Winston Hsu

(57) ABSTRACT

A magnetic attraction-fixing assembly and a rotating support structure for a portable device are provided. The magnetic attraction-fixing assembly includes two magnetic units, the two magnetic units stacked with and attracting each other; wherein each of the magnetic units respectively comprises a circular magnetic component and at least one annular magnetic component around the circular magnetic component, a magnetic pole of the circular plane of the circular magnetic component is an unlike pole to a magnetic pole of an annular plane of the annular magnetic component that is adjacent to the circular magnetic component. The rotating support structure comprises two magnetic units and a body. Magnetic attractions in both radial and axial directions are enhanced.

36 Claims, 23 Drawing Sheets

(56) References Cited

U.S. PATENT DOCUMENTS

| | | | | |
|---|---|---|---|---|
| 2011/0265289 | A1* | 11/2011 | Wu | A45C 13/1069<br>24/303 |
| 2012/0231958 | A1* | 9/2012 | Morita | H01F 6/00<br>505/211 |
| 2014/0355200 | A1* | 12/2014 | Thiers | H04W 88/02<br>361/679.41 |

* cited by examiner

MAGNETIC ATTRACTION-FIXING ASSEMBLY, TWO-PIECE APPARATUS, AND ROTATING SUPPORT STRUCTURE FOR A PORTABLE DEVICE HAVING THE MAGNETIC ATTRACTION-FIXING ASSEMBLY

CROSS REFERENCE TO RELATED APPLICATIONS

This is a Continuation in Part application of U.S. non-provisional application Ser. No. 14/533,169, filed on Nov. 5, 2014, now pending, and is incorporated herein by reference.

BACKGROUND OF THE INVENTION

1. Field of the Invention

The present invention relates to a magnetic attraction-fixing assembly, and more particularly, to a magnetic attraction-fixing assembly having an inner magnetic component and at least one outer magnetic component around the inner magnetic component, and the polarities of the adjacent magnetic components are opposite to each other. The present invention also relates to a rotating support structure for a portable device having the magnetic attraction-fixing assembly as an attracting and rotating component.

2. Description of the Prior Art

For the convenience in portability or to protect the tablet PC, a user usually buys a protective cover to cover the tablet PC. However, when the tablet PC is put into the protective cover, the increased weight will become a burden to the user's hands. A quickly removable protective cover is thus needed.

As shown in FIG. 25, a circular and flat magnet 70 of the prior art has a south pole at one side and a north pole at the other side. As shown in FIG. 26, the rotating and removable support structure of the portable device has a protective cover body 80 and a cover body 90, and the protective cover body 80 includes a retaining tab 81 having a first circular magnetic component 811 and a first buckle 812. The portable device is put into the back side of the cover body 90, which has a second circular magnetic component 91 and a second buckle 92, wherein the second circular magnetic component 91 attracts the first circular magnetic component 811, and the second buckle 92 buckles to the first buckle 812. The portable device placed in the protective cover body 80 can be rotated, and the protective cover body 80 and the cover body 90 can be separated depending on the user's need.

However, in the above prior art as shown in FIG. 26, the magnetic structure does not consider the properties of magnetic field lines. The circular magnetic components can hardly provide a magnetic attraction force for radial positioning, so that the first buckle 812 and the second buckle 92 are implemented in order to prevent the cover body 90 from radial sliding and detaching from the protective cover body 80 when the first circular magnetic component 811 attracts the second circular magnetic component 91. This approach will increase thickness and weight of the protective cover body 80 and the cover body 90; however, the protective cover body 80 and the cover body 90 are still prone to risk of separation.

FIG. 27 shows another conventional magnetic component commonly used on bags or clothes. In order to solve the problem that the circular magnetic component cannot provide the radial positioning, the middle of a first magnetic component 98 is usually milled with a groove 981 and the middle of a second magnetic component 99 has a tenon 991 fitted to the groove 981 of the first magnetic component 98 when attracted to each other for increasing the stability of radial positioning. But, either the groove 981 milled at the first magnetic component 98 or the tenon 991 mounted to the second magnetic component 99 will increase the thickness of the magnetic components. Therefore, the prior art still has disadvantages to be solved.

Another conventional way of magnetic enhancement is known to arrange magnets of opposite polarities in matrix. For example, a circular or rectangular magnet combination might be split in four quadrants and each quadrant is composed of a magnet with polarity opposite to its adjacent magnets. However, such type of magnet combination are still weak in lateral attraction when it comes to two magnetic combinations attracting with each other. Additionally, it also takes too much work putting these four quadrants of magnets into one.

SUMMARY OF THE INVENTION

According to the above description, the present invention provides an inner magnetic component and at least one outer magnetic component around the inner magnetic component, and the polarities of the adjacent magnetic components are opposite to each other, so as to improve the positioning strength of the magnetic attraction-fixing assembly, which is better than the circular magnet of the prior art.

In one aspect, the objective of the invention is to provide a magnetic attraction-fixing assembly including two magnetic units. Each magnetic unit is formed in a flat shape and the two magnetic units are stacked with and attracting each other. Each of the magnetic units respectively includes an inner magnetic component and an outer magnetic component surrounding the inner magnetic component. The inner magnetic component has an inner plane and the outer magnetic component has an outer plane, and the inner plane and the outer plane is adjacent to and coplanar with each other. For each magnetic unit, the polarity of the inner plane of the inner magnetic component is opposite to the polarity of the outer plane of the outer magnetic component. The polarity of the inner plane of the inner magnetic component of one magnetic unit is opposite to the polarity of the inner plane of the inner magnetic component of the other magnetic unit.

In another aspect, the objective of the invention is to provide a two-piece apparatus with detachability between two components. The two-piece apparatus includes a first component having a first magnetic unit formed in a flat shape and a second component having a second magnetic unit formed in a flat shape. The first magnetic unit is detachably stacked with and attracting the second magnetic unit so that the first component is detachably attached to the second component. Each of the first magnetic unit and the second magnetic unit respectively includes an inner magnetic component and an outer magnetic component surrounding the inner magnetic component. The inner magnetic component has an inner plane and the outer magnetic component has an outer plane. The inner plane and the outer plane are adjacent to and coplanar with each other. For each of the first magnetic unit and the second magnetic unit, the polarity of the inner plane of the inner magnetic component is opposite to the polarity of the outer plane of the outer magnetic component. The polarity of the inner plane of the inner magnetic component of the first magnetic unit is opposite to the polarity of the inner plane of the inner magnetic component of the second magnetic unit.

Preferably, the inner magnetic component and the outer magnetic component of each magnetic unit are either made unitary or two separate components attached to each other.

Preferably, the area of the outer plane takes up between 10% and 85% of a total area of the inner plane and the outer plane.

Preferably, the area of the outer plane takes up 40% of the total area of the inner plane and the outer plane for maximum attraction between the two magnetic units.

Preferably, the diameter of the inner plane takes up 38.7% to 94.9% of the diameter of each magnetic unit for maximum attraction between the two magnetic units.

Preferably, the inner magnetic component of each magnetic unit is circular and the outer magnetic component of each magnetic unit is annular around the circular inner magnetic component.

Preferably, the inner magnetic component of each magnetic unit is polygonal, regular polygonal, or irregular in shape so that the two magnetic units are rotatably configurable in a plurality of stable positions with each other.

Preferably, each magnetic unit is formed in the flat shape with thickness no greater than 3 mm.

Preferably, at least one magnetic unit includes a plurality of outer magnetic components surrounding the inner magnetic component concentrically and sequentially away from the center of the inner magnetic component. The inner plane is coplanar with the outer plane of each outer magnetic component.

Preferably, for the magnetic unit having a plurality of outer magnetic components, the polarity of the inner plane of the inner magnetic component is opposite to the polarity of the outer plane of the outer magnetic component adjacent to the inner magnetic component, and the polarities of the outer planes of each two adjacent outer magnetic components are opposite to each other.

Preferably, at least one from the inner magnetic component and the plurality of outer magnetic components is polygonal in shape so that the two magnetic units are rotatably configurable in one of a plurality of stable positions with each other.

Preferably, the first component is a mobile phone, a digital camera, or a tablet notebook and the second component is a rotating support structure, a selfie stick, an accessory case, a charging pad, a rechargeable battery, or a fixture plate.

In still another aspect, the objective of the invention is to provide a magnetic attraction-fixing assembly including two magnetic units, each magnetic unit formed in a rounded and flat shape, the two magnetic units stacked with and attracting each other; wherein each of the magnetic units respectively includes a circular magnetic component and at least one annular magnetic component around the circular magnetic component, each circular magnetic component includes a circular plane and each annular magnetic component includes an annular plane; the circular plane of each circular magnetic component and the annular plane of each annular magnetic component are located at the same plane, a magnetic pole of the circular plane of the circular magnetic component is an unlike pole to a magnetic pole of the annular plane of the annular magnetic component that is adjacent to the circular magnetic component.

Preferably, each of the magnetic units respectively includes multiple annular magnetic components, the annular magnetic components surround the circular magnetic component concentrically and sequentially away from the center of the circular magnetic component, the circular plane of the circular magnetic component and the annular planes of the annular magnetic components are located at the same plane; each two adjacent poles of the annular planes of the annular magnetic components are unlike poles.

Preferably, a diameter of the circular magnetic component is smaller than an inner diameter of the annular magnetic component.

Preferably, the magnetic units further include at least one cap which covers one of the magnetic units, and the at least one cap is made of ferromagnetic metal.

In still another aspect, the present invention also provides a rotating support structure for a portable device, and the magnetic attraction-fixing assembly includes two magnetic units and a body. The two magnetic units are stacked with and attract each other. The body includes a bottom, a support sheet, a carrying sheet and a cover. The bottom includes two sides; the support sheet is connected to one of the sides of the bottom; the carrying sheet is connected to the other side of the bottom that is opposite to the side connected to the support sheet; the carrying sheet has a first circular hole, wherein one of the magnetic units is embedded in the first circular hole; and the cover is connected to a side of the carrying sheet and has a second circular hole, wherein the other magnetic unit is embedded in the second circular hole.

Preferably, a diameter of the circular magnetic component is smaller than an inner diameter of the annular magnetic component.

Preferably, the magnetic units further include at least one cap which covers one of the magnetic units, and the at least one cap is made of ferromagnetic metal.

Preferably, the diameters of the magnetic units are respectively smaller than the diameter of the first circular hole of the carrying sheet and the diameter of the second circular hole of the cover.

Preferably, a first folding line is disposed on the support sheet and the bottom.

Preferably, a second folding line is disposed on the carrying sheet and the support sheet.

Preferably, the body further includes a first retaining tab located between the carrying sheet and the cover.

Preferably, the body further includes a second retaining tab located at a plane of one of the magnetic units that is mounted in the second circular hole of the cover and is opposite to another plane of said magnetic unit that is attracted to the other magnetic unit mounted in the first hole.

The advantages of the present invention are:

1. Compared to the circular magnet of the prior art, the capability of radial positioning of the present invention is better than the circular magnet of the prior art under the same thickness, weight and purity of magnet.

2. The magnetic unit of the present invention adopts the principle that unlike poles attract each other and like poles repel each other, and magnetic attractions in both radial and axial directions are greatly increased, such that the present invention has excellent capability in fixing and positioning objects.

3. The magnetic unit of the present invention is thin. Without additional buckle, the portable device can be fixed on the body of through the cover, or can be placed onto the joystick for stabilizing the object and saving effort.

4. The more annular magnetic components of the present invention are used, the stronger attraction and positioning against displacement can be achieved.

5. For manufacture, the thickness can be reduced because the magnetic units of the present invention do not need the tenon and the groove.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
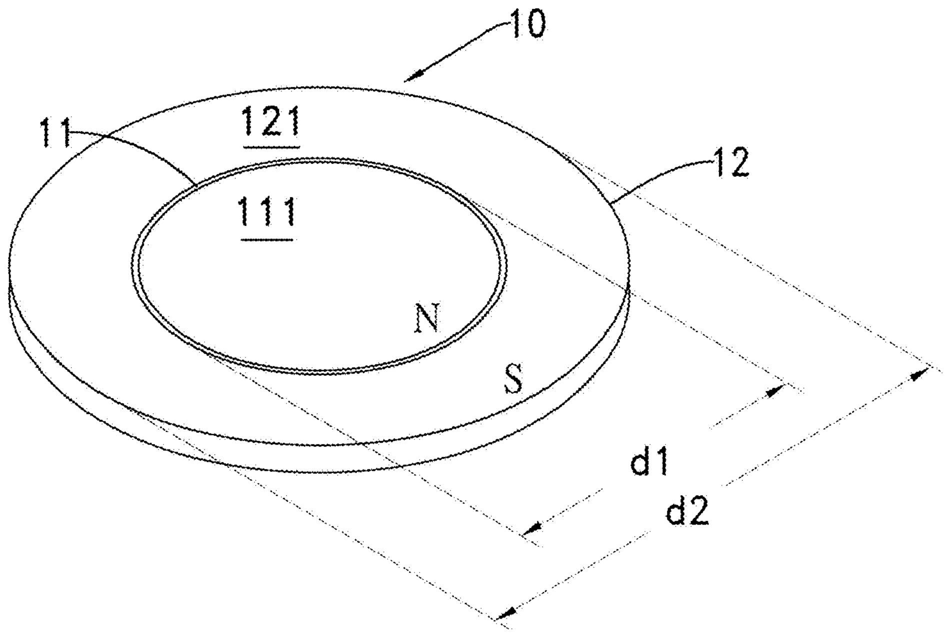
FIG. 1 is a perspective view of one of the magnetic units of the present invention.
Figure 2:
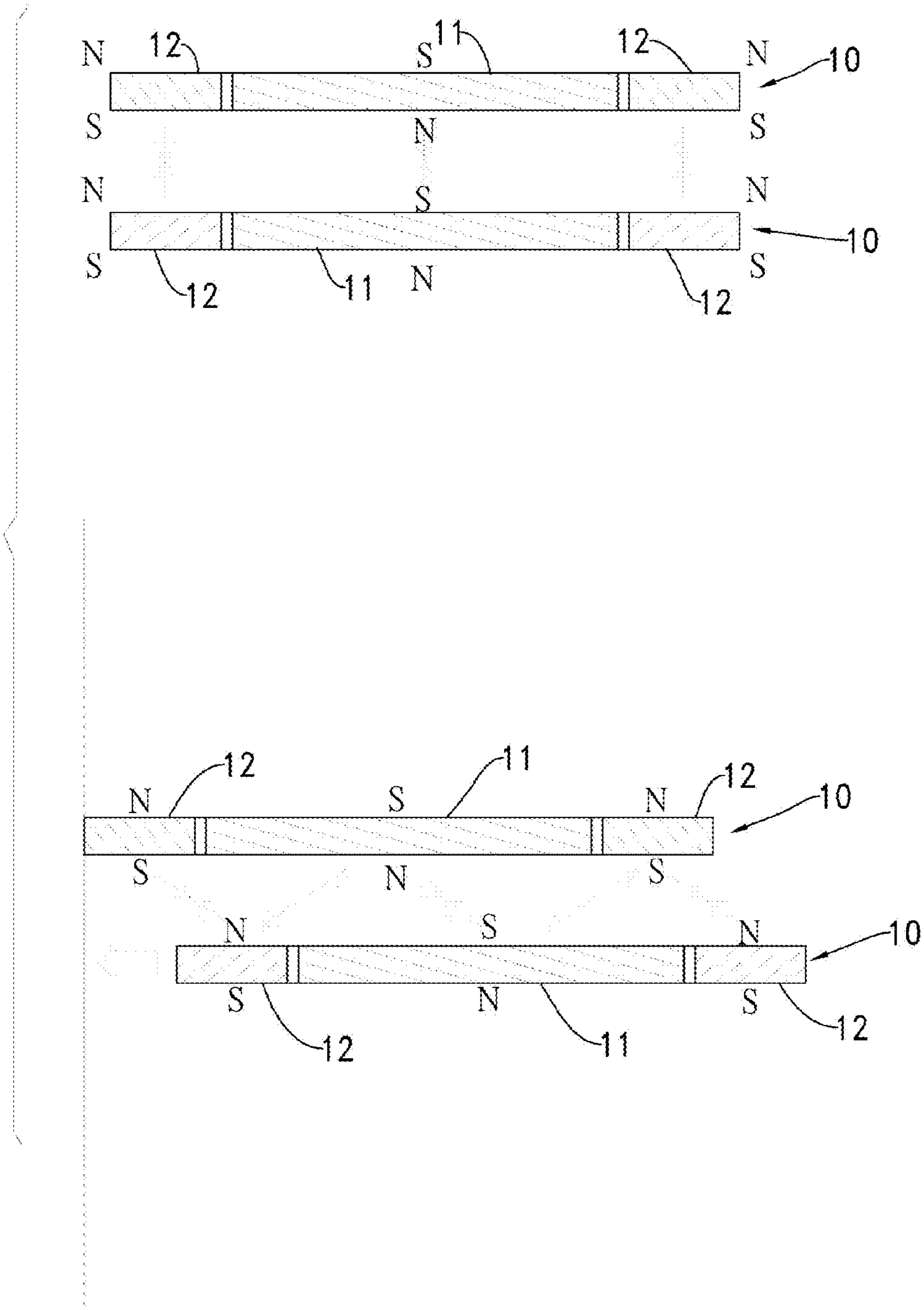
FIG. 2 is a cross-sectional view of the magnetic units.

As shown in FIG. 1 and FIG. 2, the present invention provides a magnetic attraction-fixing assembly including two magnetic units 10, wherein each magnetic unit 10 is formed in a rounded and flat shape, and the two magnetic units 10 are stacked with and attract each other; wherein each of the magnetic units 10 respectively includes a circular magnetic component 11 and at least one annular magnetic component 12 around the circular magnetic component 11. Each one of the at least one annular magnetic component 12 has an inner diameter d1 and an outer diameter d2. Each circular magnetic component 11 includes a circular plane 111 and each annular magnetic component 12 includes an annular plane 121; the circular plane 111 of each circular magnetic component 11 and the annular plane 121 of each annular magnetic component 12 are located at the same plane, a magnetic pole of the circular plane 111 of the circular magnetic component 11 is an unlike pole to a magnetic pole of the annular plane 121 of the annular magnetic component 12 that is adjacent to the circular magnetic component 11. A diameter of the circular magnetic component 11 is smaller than the inner diameter d2 of the annular magnetic component 12.

Figure 3:
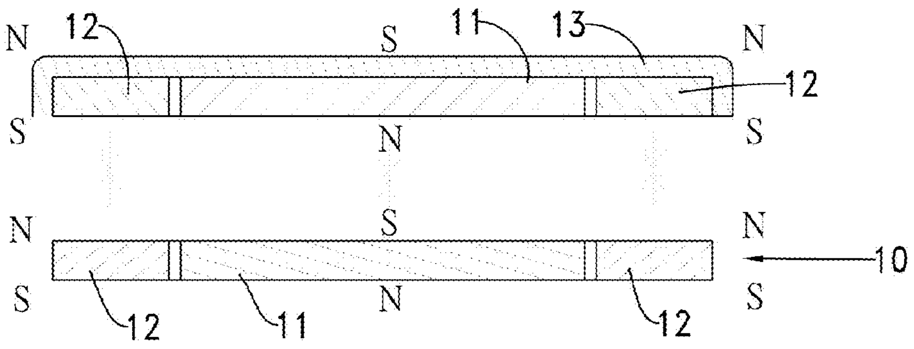
FIG. 3 is a cross-sectional view of the magnetic units and the cap.

As shown in FIG. 3, in a preferred embodiment, the magnetic units 10 further include at least one cap 13 which covers one of the magnetic units 10, and the at least one cap 13 is made of ferromagnetic metal. When the at least one cap 13 covers the magnetic unit 10, the cap 13 can concentrate the magnetic field lines to increase the magnetic attraction and for an effective attraction increase over 2 times a conventional magnet, the area of the outer plane annular plane 121 of each magnetic unit 10 takes up 35% to 93% of the total area of the magnetic unit 10. In another preferred embodiment, the magnetic units 10 include two caps 13, which respectively cover the two magnetic units 10.

Figure 4:
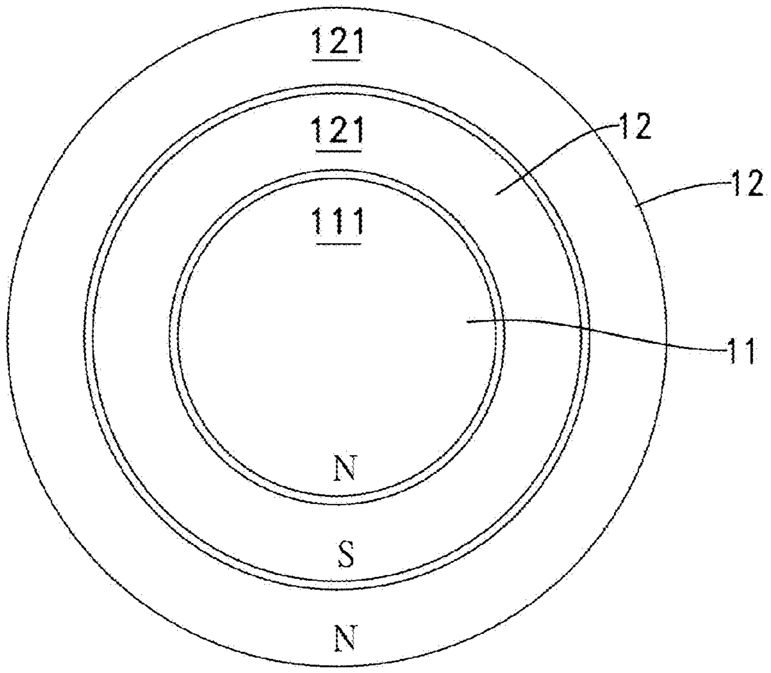
FIG. 4 is a top view of another magnetic unit of the present invention.

As shown in FIG. 4, in another preferred embodiment, each of the magnetic units 10 respectively includes multiple annular magnetic components 12, the annular magnetic components 12 surround the circular magnetic component 11 concentrically and sequentially away from the center of the circular magnetic component, the circular plane 111 of the circular magnetic component 11 and the annular planes 121 of the annular magnetic components 12 are located at the same plane; each two adjacent poles of the annular planes 121 of the annular magnetic components 12 are unlike poles.

Figure 5:
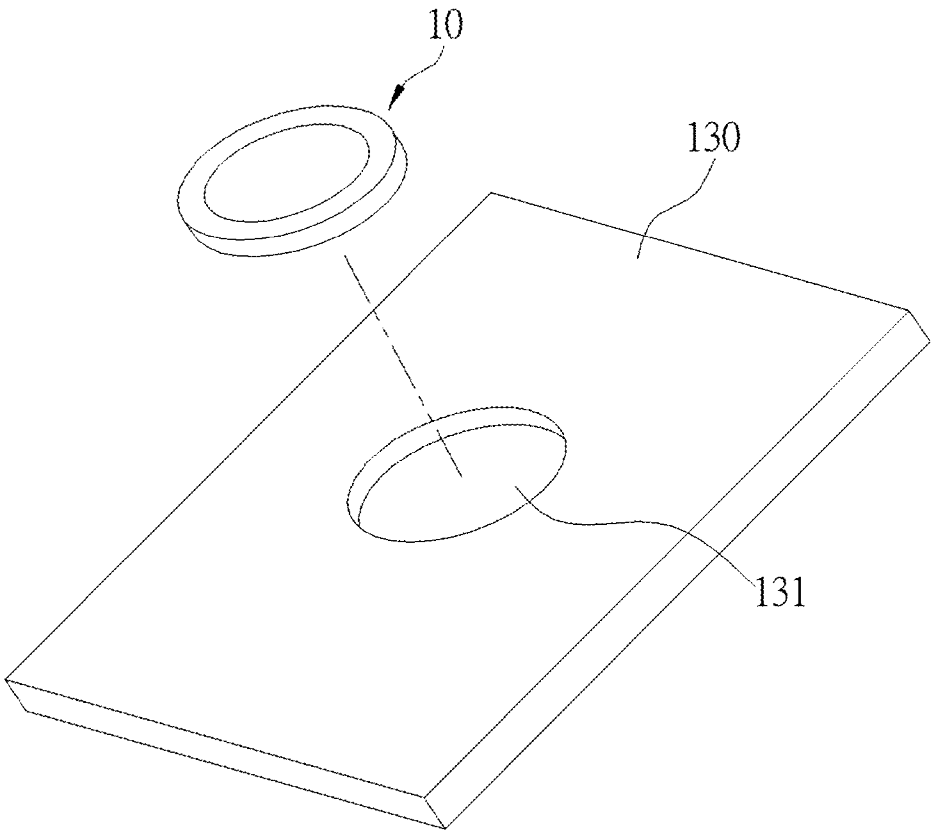
FIG. 5 is a perspective view of the magnetic unit to be embedded in a cap plate of the present invention.
Figure 6:
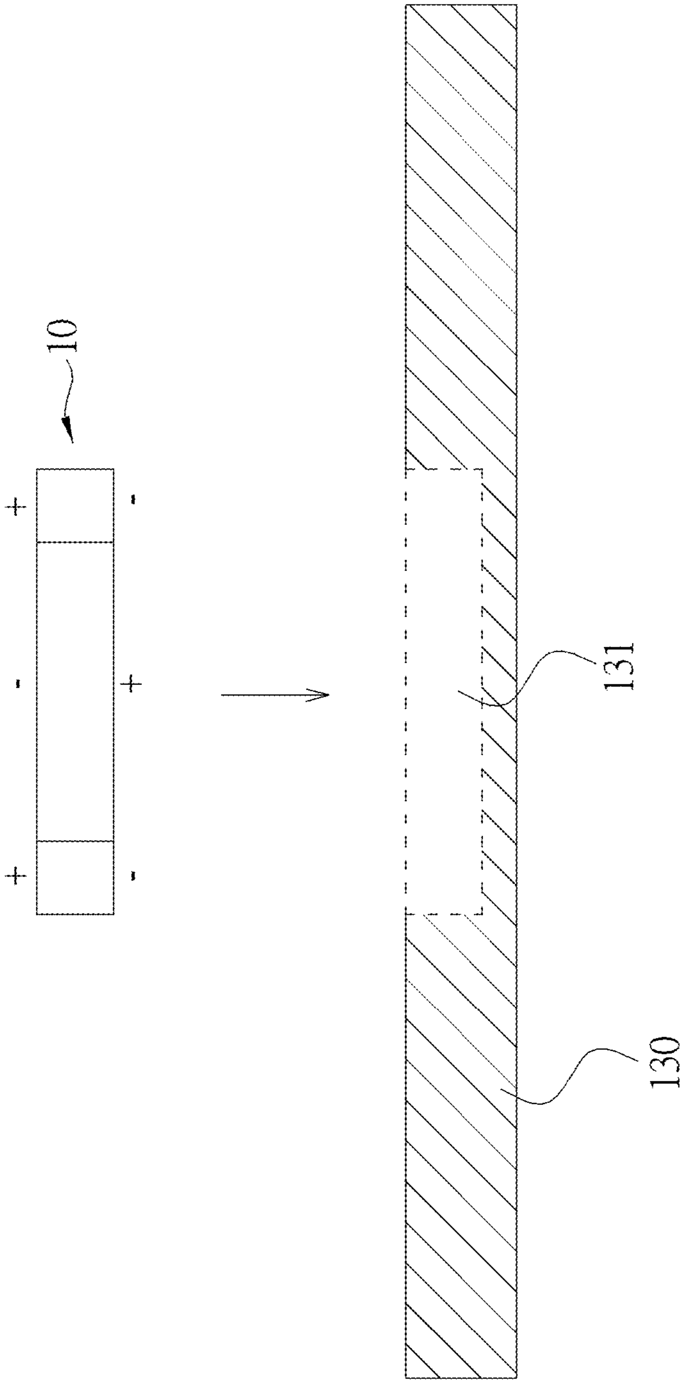
FIG. 6 is a side view of FIG. 5.

As shown in FIG. 5 and FIG. 6, in another preferred embodiment, the cap may further be transformed into a cap plate 130 with extended outward shell. As the magnetic unit 10 is covered by the cap plate 130 in the indented portion 131, not only the cap plate 130 can concentrate the magnetic field lines to increase the magnetic attraction, but further increase buffer that can strongly withstand lateral external force toward the magnetic units 10.

As shown in FIG. 2, when the present invention is in use, the two magnetic units 10 can attract each other by the magnetic force. When radial displacement occurs between the two magnetic units 10 due to external force, the magnetic pole of the contact surface of the circular magnetic component 11 of one of the magnetic units 10 is identical to the magnetic pole of the contact surface of the annular magnetic component 12 of the other magnetic unit 10 to generate repulsive force to resist displacement. Therefore, the present invention significantly enhances the positioning stability of the magnetic units 10 via the principle that like magnetic poles repel each other.

Figure 7:
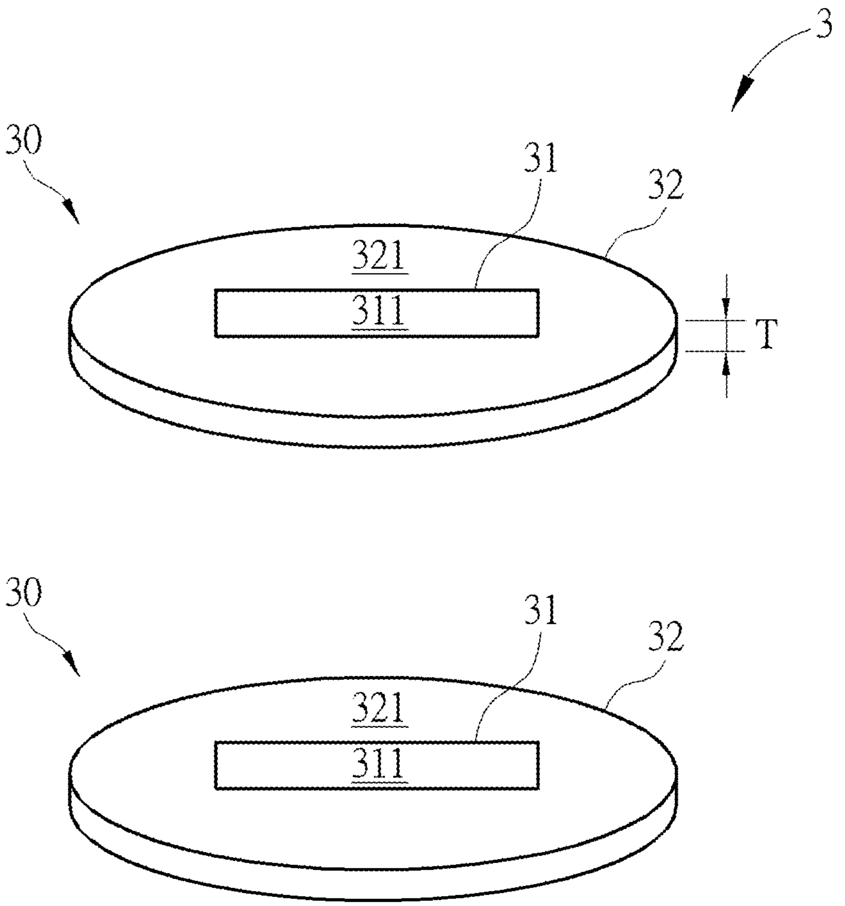
FIG. 7 is a perspective view of a preferred embodiment of magnetic attraction assembly.

As shown in FIG. 7, a preferred embodiment of magnetic attraction assembly is provided. Although the embodiment in FIG. 1-FIG. 6 shows that the magnetic components of the magnetic units are circular and annular, it is not a limitation to the application. For the embodiment in FIG. 7, the magnetic attraction-fixing assembly 3 includes two magnetic units 30. Each magnetic unit 30 is formed in a flat shape with thickness T and the two magnetic units 30 are stacked with and attract each other. Each of the magnetic units 30 respectively includes an inner magnetic component 31 and an outer magnetic component 32 surrounding the inner magnetic component 31. The inner magnetic component 31 has an inner plane 311 and the outer magnetic component 32 has an outer plane 321 and the inner plane 311 and the outer plane 321 adjacent to and coplanar with each other. For each magnetic unit 10, the polarity of the inner plane 311 of the inner magnetic component 31 is opposite to the polarity of the outer plane 321 of the outer magnetic component 32. Besides, the polarity of the inner plane 311 of the inner magnetic component 31 of one magnetic unit 30 is opposite to the polarity of the inner plane 311 of the inner magnetic component 31 of the other magnetic unit 30.

In one embodiment, the inner magnetic component 31 and the outer magnetic component 32 of each magnetic unit 30 are made unitary and in other embodiment, the inner magnetic component 31 and the outer magnetic component 32 of each magnetic unit 30 may also be two separate components attached to each other.

Figure 8:
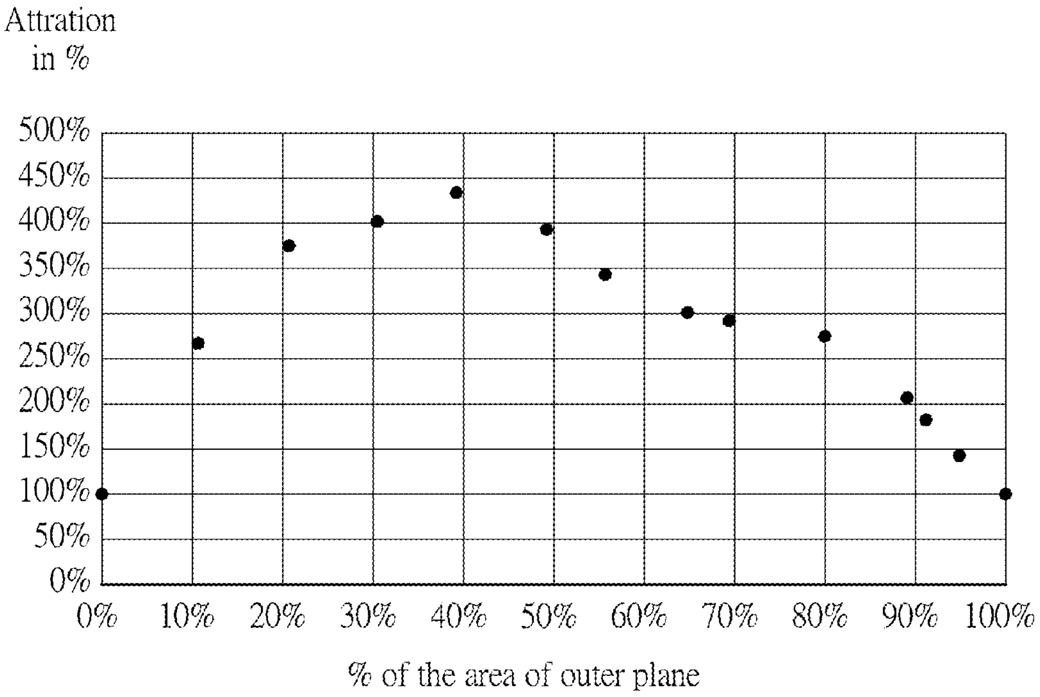
FIG. 8 is an illustrative chart of relation between the proportion of attraction and the percentage of the area of the outer plane for a magnetic unit in the present invention.

Please refer to FIG. 8, which is an illustrative chart of relation between the proportion of attraction and the percentage of the area of the outer plane taken in a magnetic unit in the present invention. The configuration of inner magnetic component 31 and outer magnetic component 32 with opposite polarities at the same plane provides enhancement of attraction between two magnetic units 30 with such configuration. A detailed result of the relation between the proportion of attraction and the percentage of the area of the outer plane 321 for the magnetic unit 30 shows that when the area of outer plane 321 is 100% of the total area of the magnetic unit 30, i.e., the magnetic unit 30 as a conventional magnet that has only one polarity at one side, the attraction between two such magnetic units 30 has a 100% magnitude, or 'unit strength'. For an embodiment that the area of the outer plane 321 of each magnetic unit 30 takes up 10% to 85% of the total area of the magnetic unit 30, the attraction between two such magnetic units 30 escalates to above 200% of 'unit strength' and for a preferred embodiment, the area of the outer plane takes up 30% to 50% of the total area of the magnetic unit 30 to provide at least 400%, or four times, of 'unit strength'. In other words, for the rounded magnetic unit 30 with circular inner magnetic component 31, the diameter of the inner plane 311 may take up 38.7% to 94.9% of the diameter of the magnetic unit for maximum attraction between the two magnetic units 30.

It should be noted that, the result provided above and in FIG. 8 is based on the same control parameters for a conventional magnet and the magnetic unit in the invention. For example, the magnets as conventional ones and the magnetic unit are made by the same material, or being processed by the same way of magnetization. Additionally, for a practical implementation, not only each magnetic unit is formed in the flat shape but the thickness T of each magnetic unit 30 as mentioned in FIG. 7 is no greater than 3 mm. For such implementation, the thickness of the magnetic units 30 being in a relative small scale, a much greater attraction, say 4 to 5 times the 'unit strength' can be provided by the magnetic unit 30 of the invention. It should also be noted that it is preferable for a better enhancement of attraction under the condition of a relatively thin piece as the thickness of each magnetic unit 30 is no greater than 50% of the planar dimension (width) of the magnetic unit 30. Also, when the ratio of thickness to width of the magnetic unit 30 increases, the percentage of the area of outer plane taken in the magnetic unit 30 that outcomes maximum attraction also increases accordingly. For the embodiment shown in FIG. 8, the ratio of thickness to width of the magnetic unit 30 is about 1:14 to 1:18.

Figure 9:
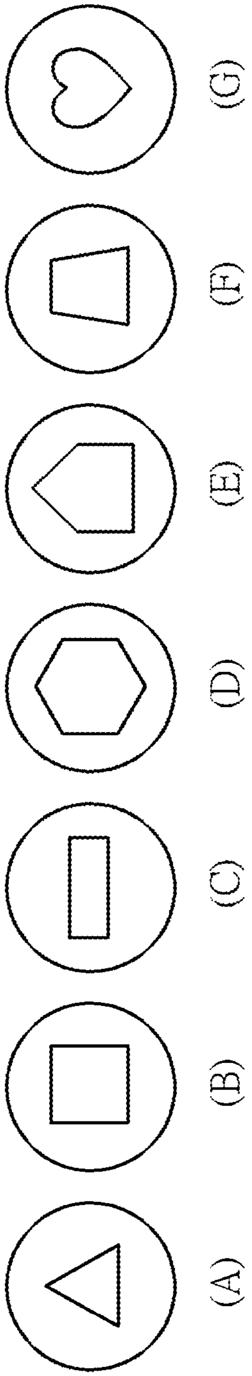
FIG. 9 is illustration of various types of magnetic units with different shapes of inner planes applicable in the embodiments of the invention.

Please refer to FIG. 9, which is illustration of various types of magnetic units with different shapes of inner planes applicable in the embodiments of the invention. In various embodiments of the invention, the inner magnetic component of each magnetic unit 30 may be polygonal as shown in (A)-(F) or irregular in shape, for example the heart shape as shown in (G), and still in another embodiments, which are not shown in FIG. 9, both the inner magnetic component and the outer magnetic component may be made polygonal or the outer magnetic component is made polygonal and the inner magnetic component is circular. For the polygonal type, (A), (B), (D) are shown to be regular polygonal ones while the rest are irregular polygonal ones. Whatever the shape the inner magnetic component is, the embodiments provided in FIG. 9 provide that the two magnetic units 30 may be rotatably configurable in at least one, mostly more than one stable position with each other when the two magnetic units 30 are rotated to the positions where the polygonal components of the two magnetic units 30 superpose.

Figure 10:
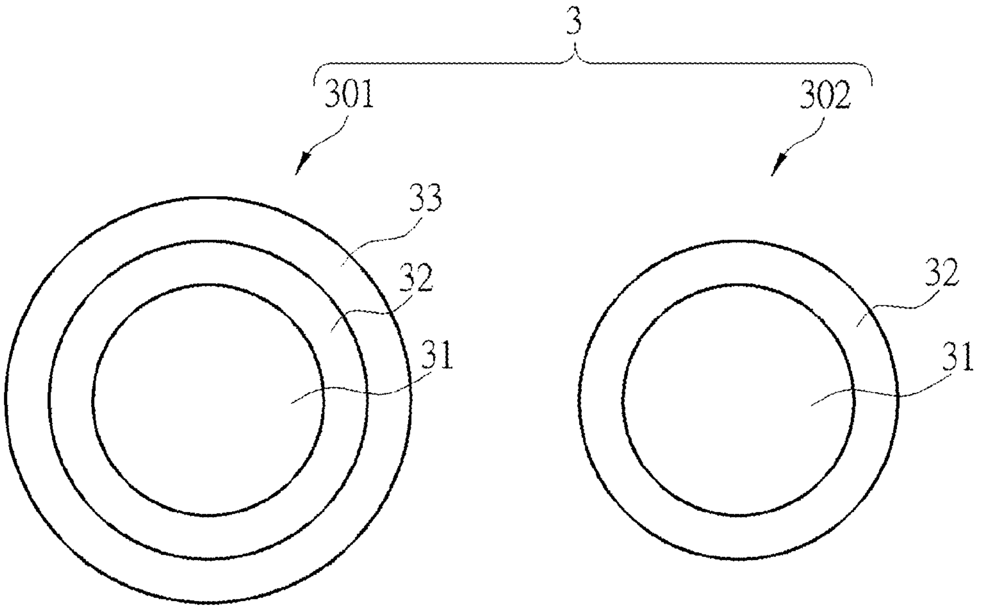
FIG. 10 is a top view of another embodiment of the magnetic units.
Figure 11:
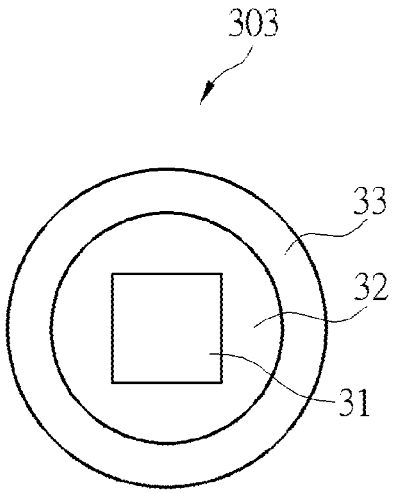
FIG. 11 is a top view of another embodiment of magnetic unit with polygonal inner plane.

Please refer to FIG. 10 and FIG. 11. FIG. 10 is a top view of another embodiment of the magnetic units, and FIG. 11 is a top view of another embodiment of magnetic unit with polygonal inner plane. Like the previous embodiment shown in FIG. 4, the magnetic attraction-fixing assembly provided in the invention may include one magnetic unit 301 having circular magnetic component 31 with multiple annular magnetic components 32, 33 and the other magnetic unit 302 having circuit magnetic component 31 with one annular magnetic component 32. The polarity of each magnetic component of each magnetic unit 301, 302 follows what is presented in the description of FIG. 7. For the embodiment in FIG. 11, a magnetic unit 303 may also has an inner magnetic component 31 having polygonal shape and multiple outer magnetic components 32, 33 surrounding the inner magnetic component 31.

Embodiments provided in the following paragraphs and related figures show a plurality of two-piece apparatus with detachability between two components provided by the invention. Each apparatus has a first component and a second component with a first magnetic unit and a second magnetic unit respectively included/embedded/integrally formed in the components. The first magnetic unit and the second magnetic unit have essentially the same structure and feature as what is discussed above.

Figure 12:
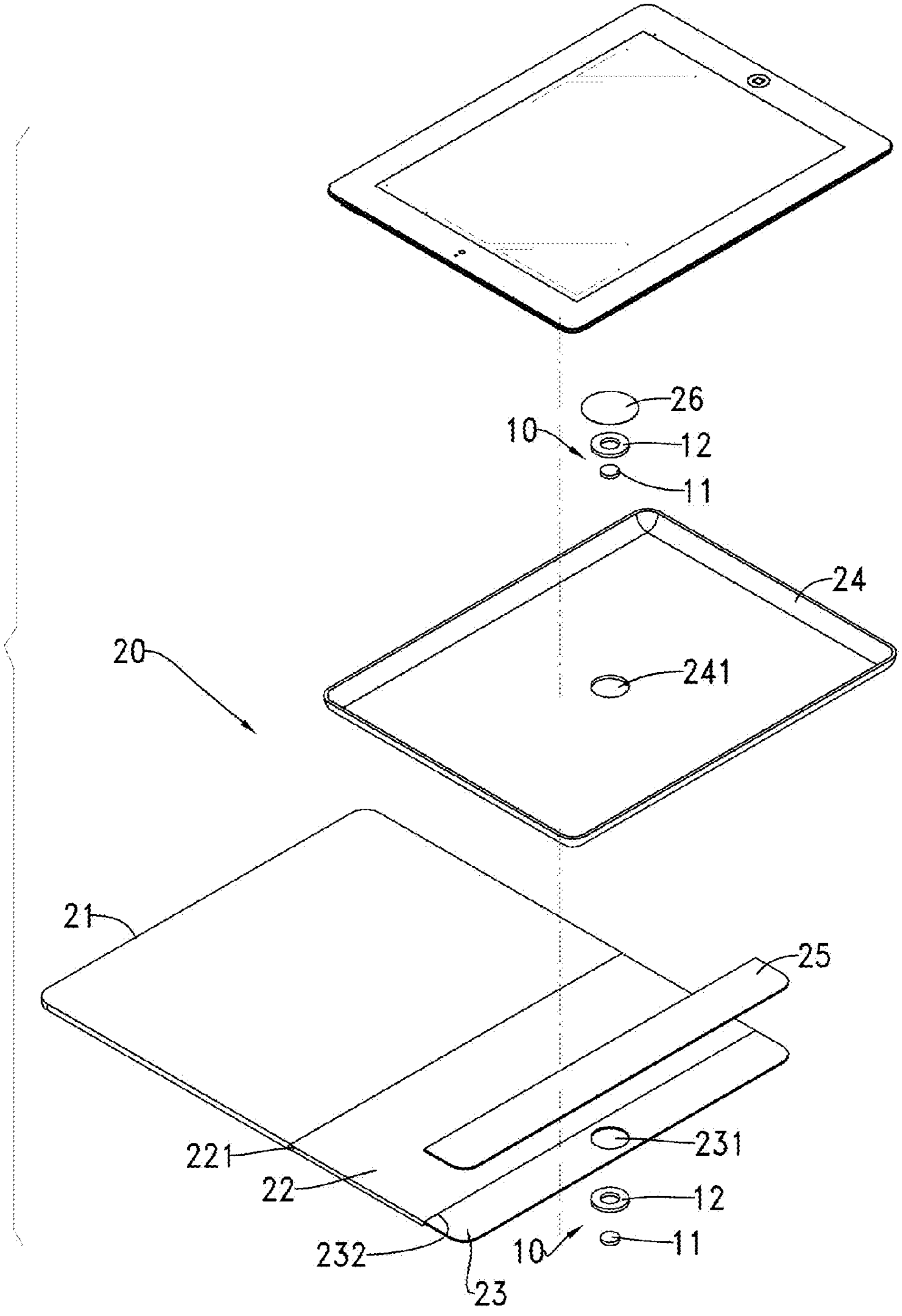
FIG. 12 is an exploded view of the preferred embodiment of the rotating support structure for a portable device.

As shown in FIG. 12, the present invention provides a rotating support structure for a portable device, and the rotating support structure includes the above said two magnetic units 10 and a body 20.

The two magnetic units 10 are stacked with and attract each other. The diameter of the circular magnetic component 11 is smaller than the inner diameter of the annular magnetic component 12. In a preferred embodiment, the magnetic units 10 further include at least one cap 13 (referring to FIG. 3) covering one of the magnetic units 10.

The body 20 includes a bottom 21, a support sheet 22, a carrying sheet 23 and a cover 24. The bottom 21 is a rectangular structure and has two sides; wherein a first folding line 221 is disposed on the support sheet 22 and the bottom 21; wherein the support sheet 22 is connected to one of the sides of the bottom 21; the carrying sheet 23 is connected to the other side of the bottom 21, which is opposite to the side connected to the support sheet 22. The carrying sheet 23 has a first circular hole 231, such that one of the magnetic units 10 is embedded in the first circular hole 231. A second folding line 232 is disposed on the carrying sheet 23 and the support sheet 22. The cover 24 is connected to a side of the carrying sheet 23 and has a second circular hole 241, and the other magnetic unit 10 is embedded in the second circular hole 241. The diameters of the magnetic units 10 are respectively smaller than a diameter of the first circular hole 231 of the carrying sheet 23 and a diameter of the second circular hole 241 of the cover 24.

In another preferred embodiment, the body 20 further includes a first retaining tab 25 including a thin and high-strength material and located between the carrying sheet 23 and the cover 24. The thin and high-strength material is, but not limited to, carbon-fiber plate. In another preferred embodiment, the body 20 further includes a second retaining tab 26 located at a plane of one of the magnetic units 10 that is mounted in the second circular hole 241 of the cover 24 and is opposite to another plane of said magnetic unit 10 that is attracted to the other magnetic unit 10 mounted in the first hole 231. The second retaining tab 26 includes a thin and high-strength material which is, but not limited to, plastic, poly-carbon, fiberglass, or carbon fiber and mental.

Figure 13:
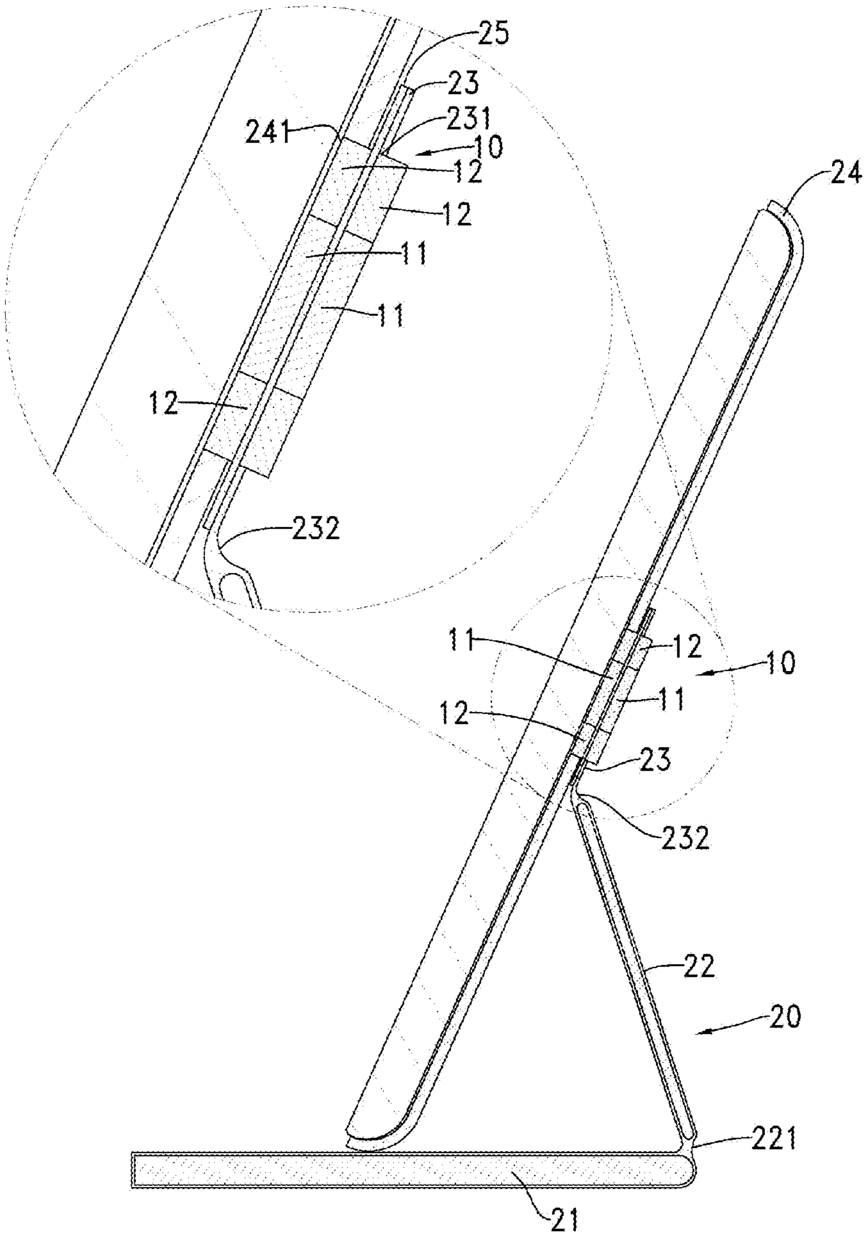
FIG. 13 illustrates a cross-sectional view and operational view of the preferred embodiment of the rotating support structure for a portable device.

As shown in FIG. 13, when the present invention is in use, a portable electronic device is put into the cover 24. One of the magnetic units 10 that is fitted in the second circular hole 241 of the cover 24 magnetically attracts the other magnetic unit 10 which is fitted in the first circular hole 241 of the carrying sheet 23 to combine both the cover 24 and the carrying sheet 23. The first folding line 221 of the support sheet 22 and the second folding line 232 of the carrying sheet 23 can be folded, and a side of the portable electronic device can be placed on the bottom 21 for supporting and erecting the portable electronic device. Because of magnetic attraction of the support structure, an angle of the magnetic units 10 can be easily adjusted to vertical or lateral reading model. When a user handles the portable electronic device, the body 20 can be separated from the portable electronic device if the user wants to reduce the weight for handling. When a user wants to change the color of the body 20 or the body 20 has Bluetooth wireless keyboard, the body 20 can be changed directly to the desired color without removing the cover 24.

Figure 14:
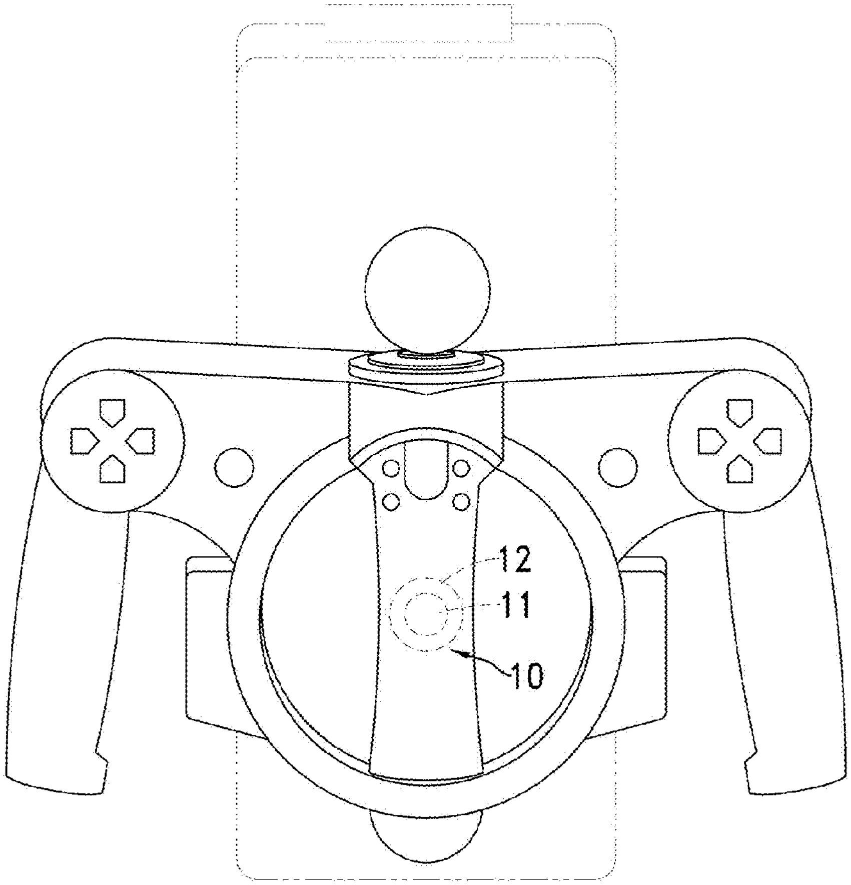
FIG. 14 illustrates an operational view of the preferred embodiment of the rotating support structure embedded in the joystick of the present invention.

As shown in FIG. 14, in another preferred embodiment, when a game joystick (the first component) has one of the magnetic units 10 at the back, and the support seat (the second component) of the joystick has the other magnetic unit 10, a user can easily rotate the joystick, which is attracted to the support seat by the magnetic unit 10 for relieving hand pain caused by manually lifting the joystick. Also, the magnetic attraction-fixing assembly of the present invention can generate repulsive force to resist displacement for avoiding the separation of the joystick and the support seat during intense gaming exercise. The magnetic units 10 can be used on two objects that may be selectively fixed or separated, or an object that needs to be fixed to or separated from a wall, a car, a bag, etc.

Figure 15:
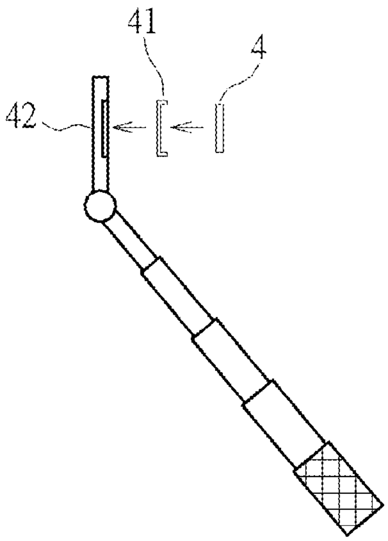
FIG. 15 and FIG. 16 illustrate an operational side view and an operational front view of the preferred embodiment of an electronic device and a selfie stick as a two-piece apparatus.
Figure 16:
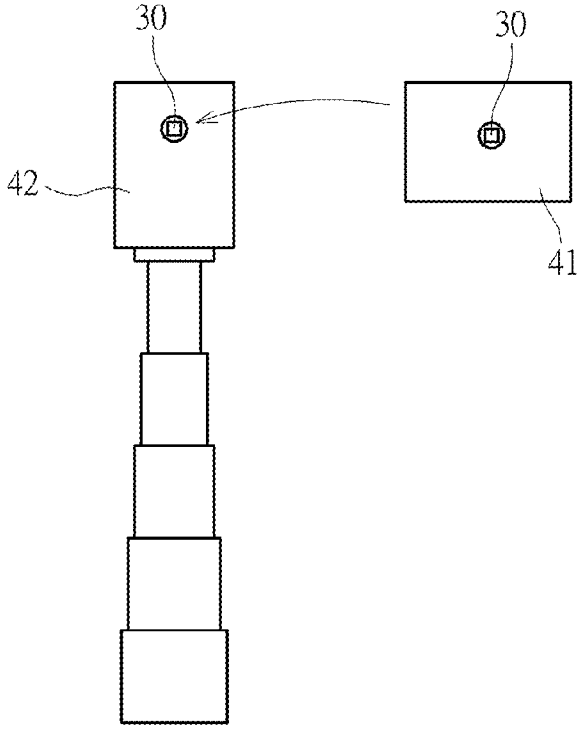

As shown in FIG. 15 and FIG. 16, in still another preferred embodiment, an electronic device 4 such as a mobile phone, a tablet notebook, or a digital camera as the first component can be first mounted with an accessory cover 41, which has one of the magnetic units 30 at the back, and a selfie stick 42 as the second component has the other magnetic unit 30. The electronic device 4 can be easily and fixedly attached to the selfie stick 42 by means of the use of the two magnetic units 30 attracting with each other.

Figure 17:
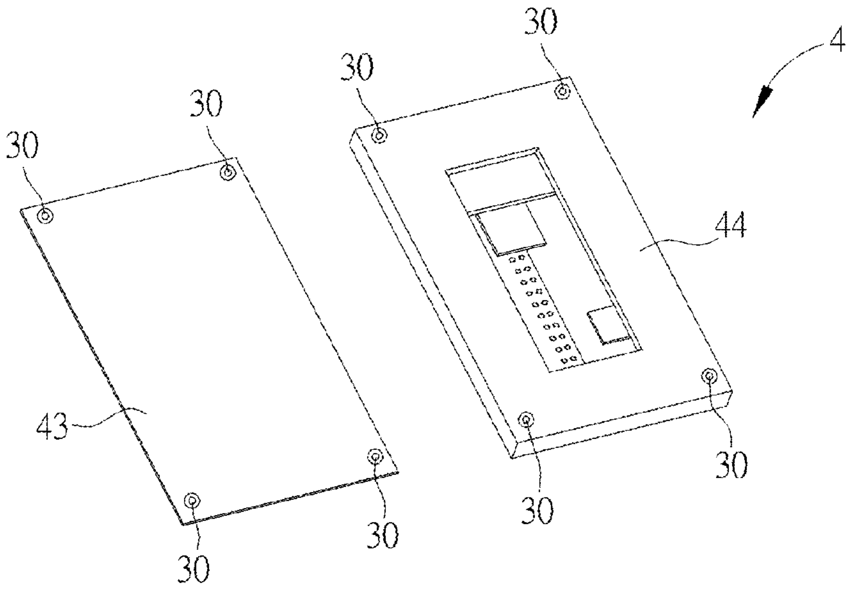
FIG. 17 illustrates an operational view of the preferred embodiment of an electronic device with detachable accessory case.

As shown in FIG. 17, in still another preferred embodiment, the electronic device 4 includes a main body 44 as the first component that has a plurality of magnetic units 30 at the back and an accessory case 43 as the second component, which has correspondingly a plurality of other magnetic units 30. With the two set of magnetic units 30, the accessory case 43 can be easily mounted to the main body 44 with strong enough attraction.

Figure 18:
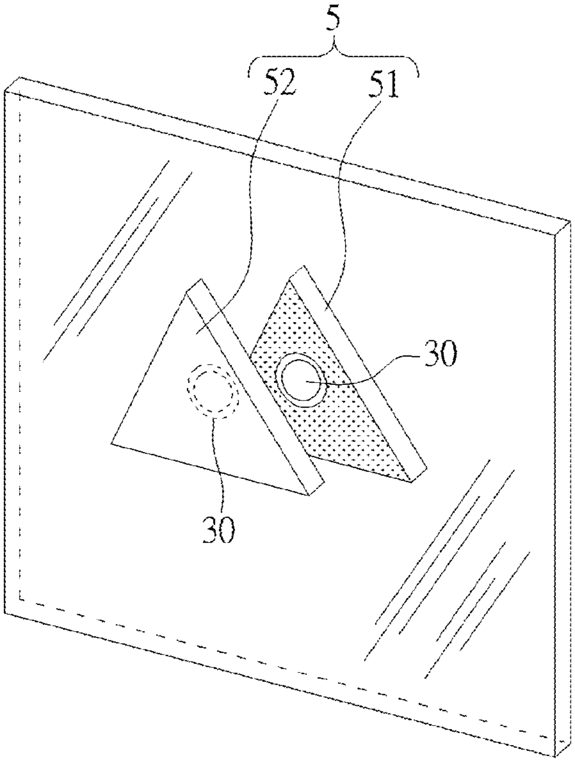
FIG. 18 illustrates an operational view of the preferred embodiment of a window cleaner.

As shown in FIG. 18, in still another embodiment, the two-piece apparatus is a window cleaner 5 with a first component 51 having a magnetic unit 30 and a second component having another magnetic unit 30. The two components 51, 52 are disposed at both sides of a glass window, with proper cleaning pads on the components, and attached with each other with firm attraction via the magnetic units 30.

Figure 19:
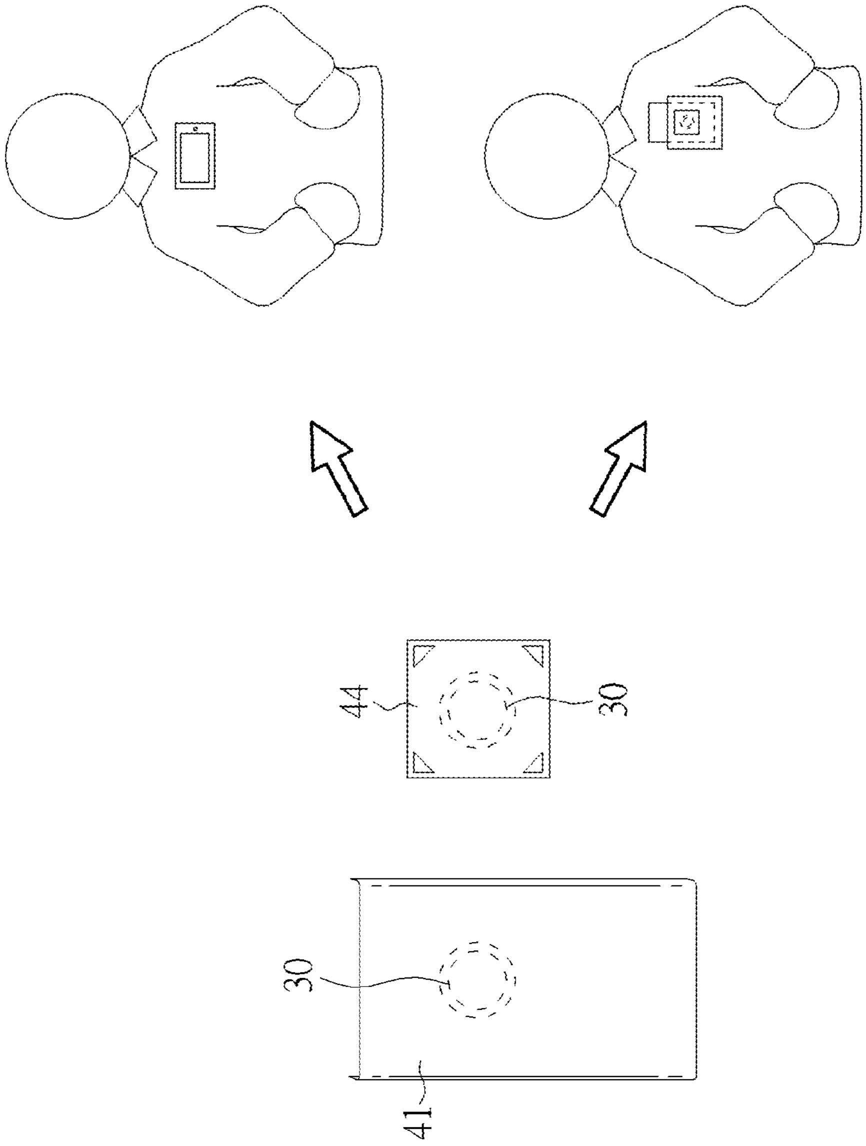
FIG. 19 illustrates an operational view of the preferred embodiment of an electronic device with a fixture plate.

As shown in FIG. 19, in still another embodiment, the electronic device 4 (as shown in FIGS. 13-17) may be first mounted with the accessory cover 41, where the magnetic unit(s) 30 is(are) embedded in the accessory cover 41 or adhered to the surface of the accessory cover 41. A fixture plate 44 as the second component has another magnetic unit(s) 30 for being detachably mounted to the accessory cover 41 and the electronic device 4. The fixture plate 44 can be disposed at one side of any person's shirt or shirt's pocket, whereas the accessory cover 41 and the electronic device 4 is disposed at opposite side so that the electronic device 4 is firmly attached to the shirt with the help of the fixture plate 44.

Figure 20:
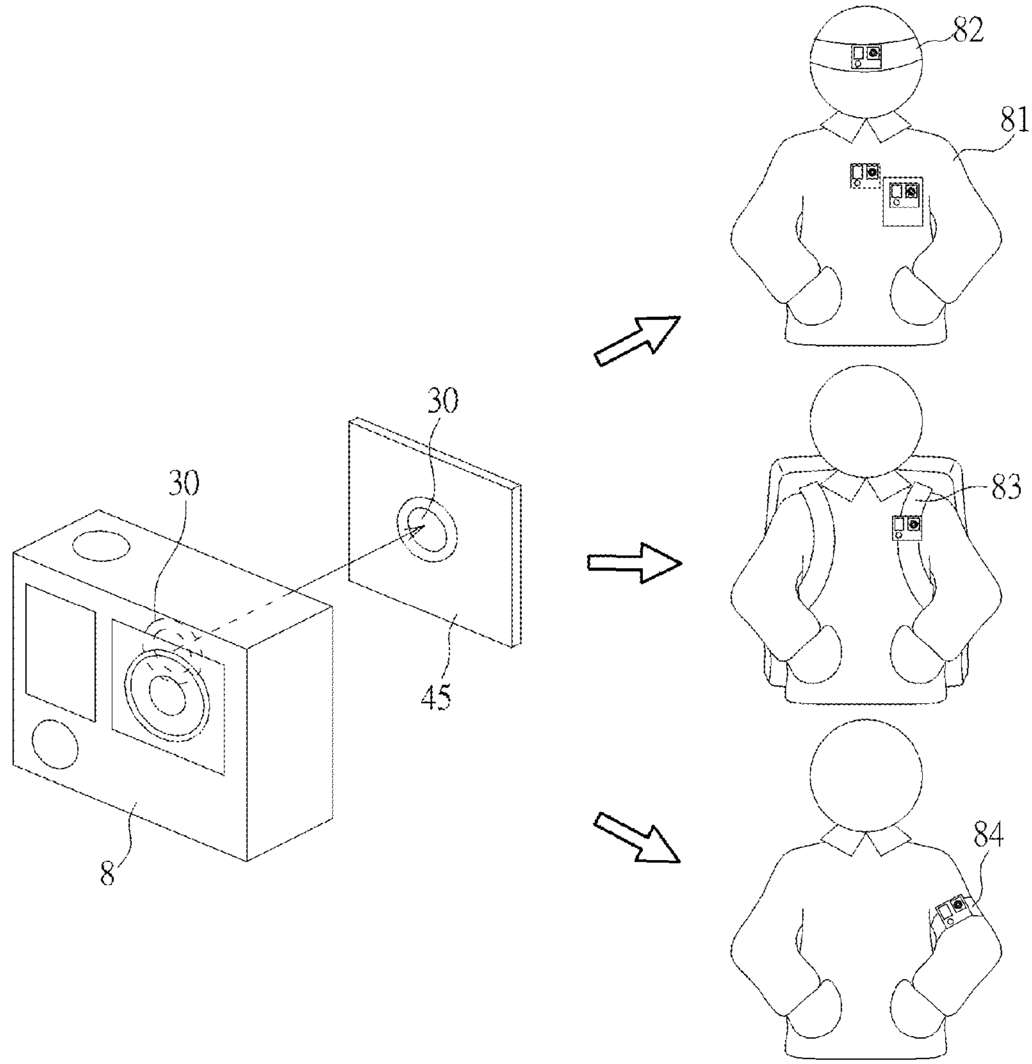
FIG. 20 illustrates an operational view of the preferred embodiment of a sport camera with a fixture plate.

As shown in FIG. 20, instill another embodiment, a sport camera 8 uses the magnetic unit(s) 30 at the back to be detachably attached with a fixture plate 45 as the second component that has another magnetic unit (s) 30. The fixture plate 45 can be disposed at one side of a shirt 81 or shirt's pocket like the embodiment in FIG. 19 or at a head band 82, a bag strap 83, or an arm strap 84, whereas the sport camera 8 (or the accessory cover 41 as in FIG. 19) is attached thereto so that the sport camera 8 (the accessory 41 and the electronic device 4 as in FIG. 19) is firmly attached to any possible place with the help of the fixture plate 45. Instill another embodiment, the fixture plate 45 in FIG. 20 or the accessory cover 41 in FIG. 19 may also be incorporated with a holding stand on a bicycle for easy attachment and detachment of the electronic device 4 or the sport camera 8 on the bicycle.

Figure 21:
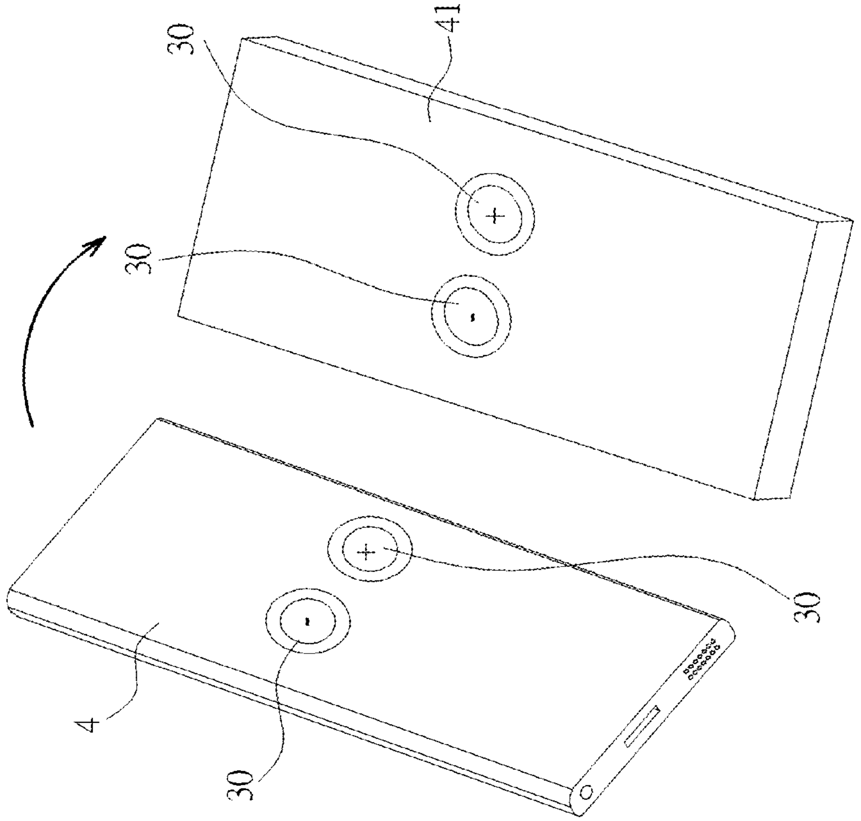
FIG. 21 and FIG. 22 illustrate two components magnetically attached with each other using configurations of multiple magnetic units at each of the component.
Figure 22:
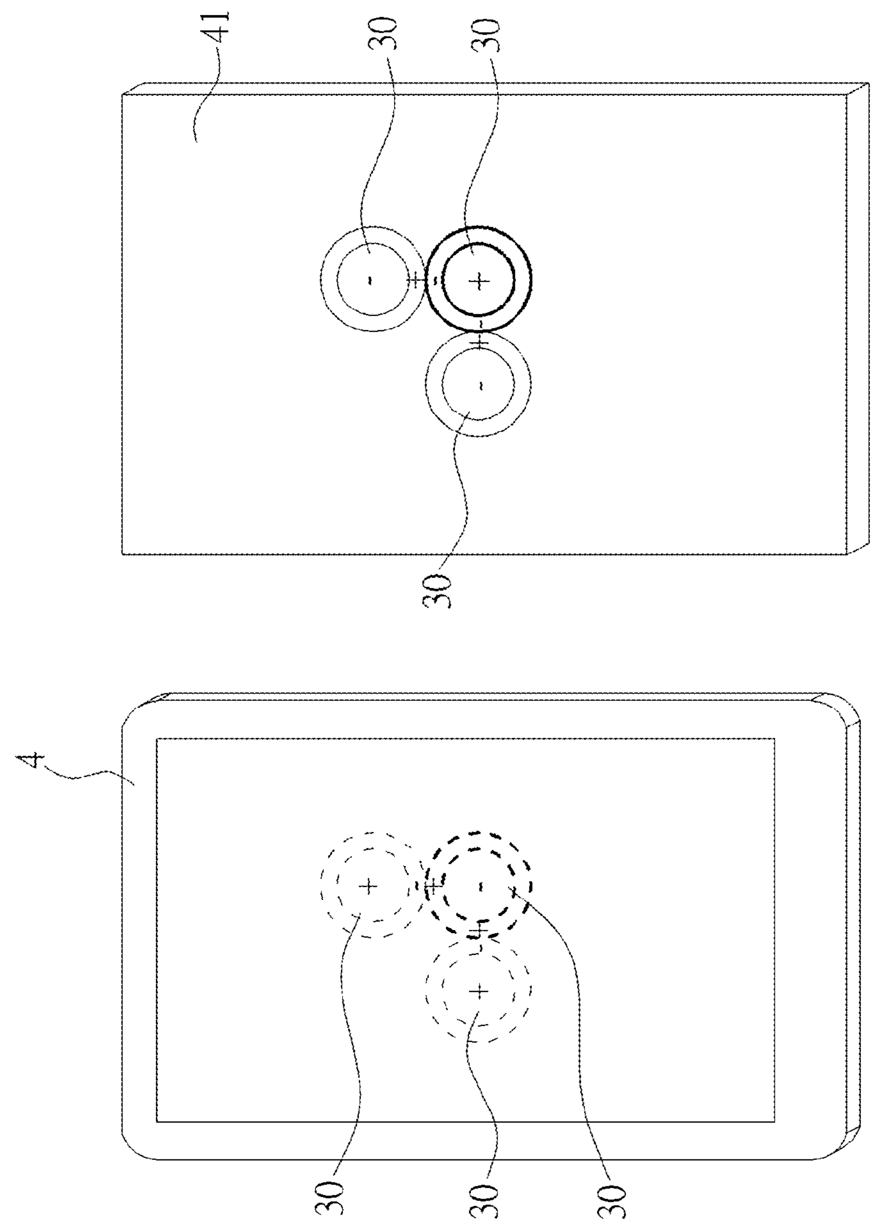
Figure 23:
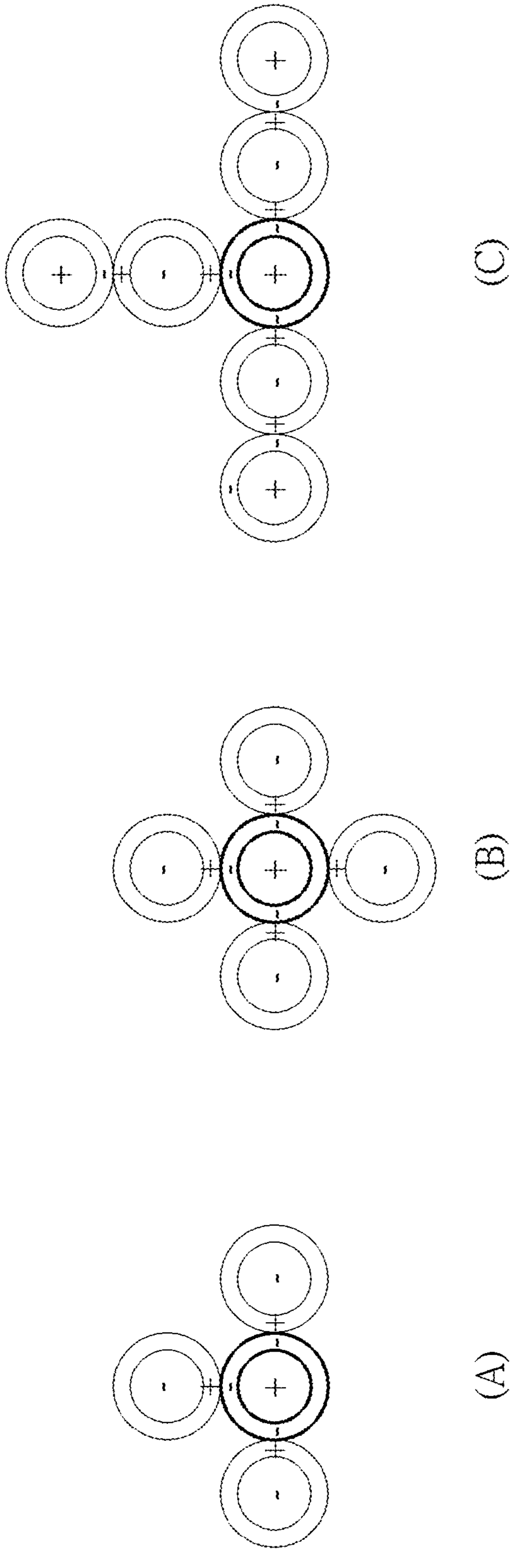
FIG. 23 illustrates several configurations of multiple magnetic units.

As shown in FIG. 21 and FIG. 22, in still another embodiments, multiple magnetic units 30 may be configured on each of the first component (the electronic device 4) and the second component (the accessory cover 41) in a straight line (FIG. 21) or in a rectangular way (FIG. 22). FIG. 23 shows further some possible, but not limited to, configurations of multiple magnetic units 30 that may be deployed on two components. It should be noted that the plus (+) sign and the minus (−) sign in FIG. 21-23 represent opposite polarities. For the embodiments in FIG. 21-23, the configurations of the multiple magnetic units 30 allow the two components (the electronic device 4 and the accessory cover 41 for example) to be magnetically attached with each other in at least one, or more stable positions. Particularly, each configuration of multiple magnetic units 30 in FIG. 22-23 has this magnetic unit drawn in thick line as a rotation center (central unit), while the neighboring magnetic units (non-central units) of the central unit are opposite in polarity as shown in the figures. The neighboring magnetic units of the central unit, and the ones next to them, are disposed at certain included angles with the next 'line' of non-central unit, rectangular in these embodiments but possibly any included angle, so that one of the two components (the electronic device 4 and the accessory cover 41 for example) may be rotated to one of a plurality of stable angles with the other component.

Figure 24:
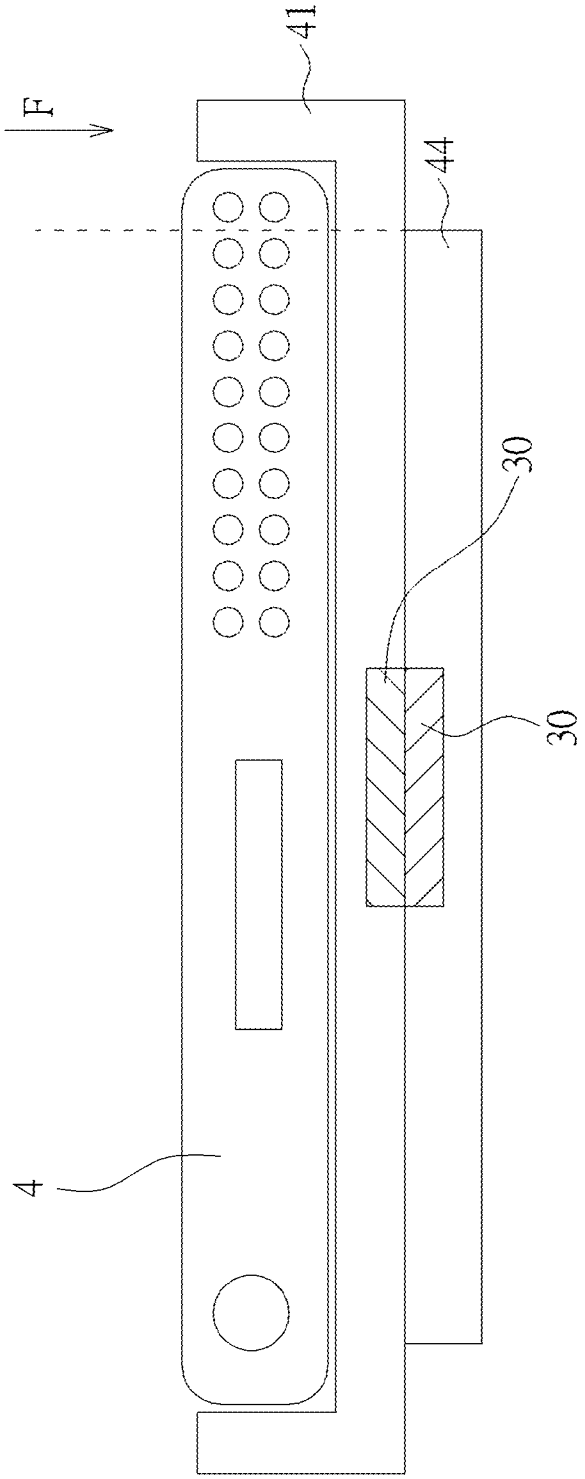
FIG. 24 illustrates a side view of another embodiment of an electronic device with a fixture plate.
Figure 25:
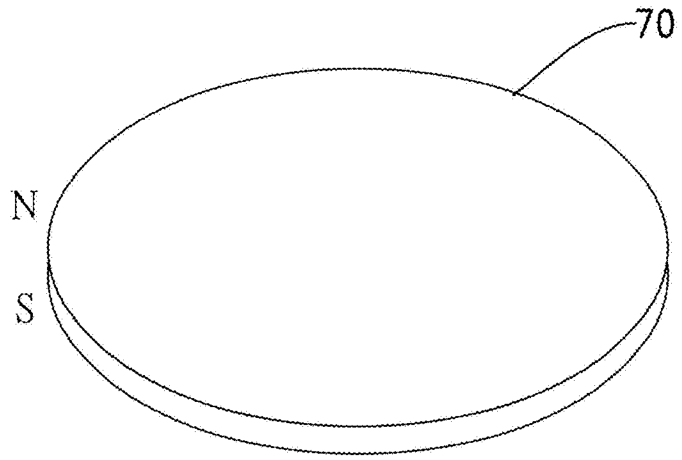
FIG. 25 is a perspective view of the magnetic attraction-fixing assembly in accordance with the prior art.
Figure 26:
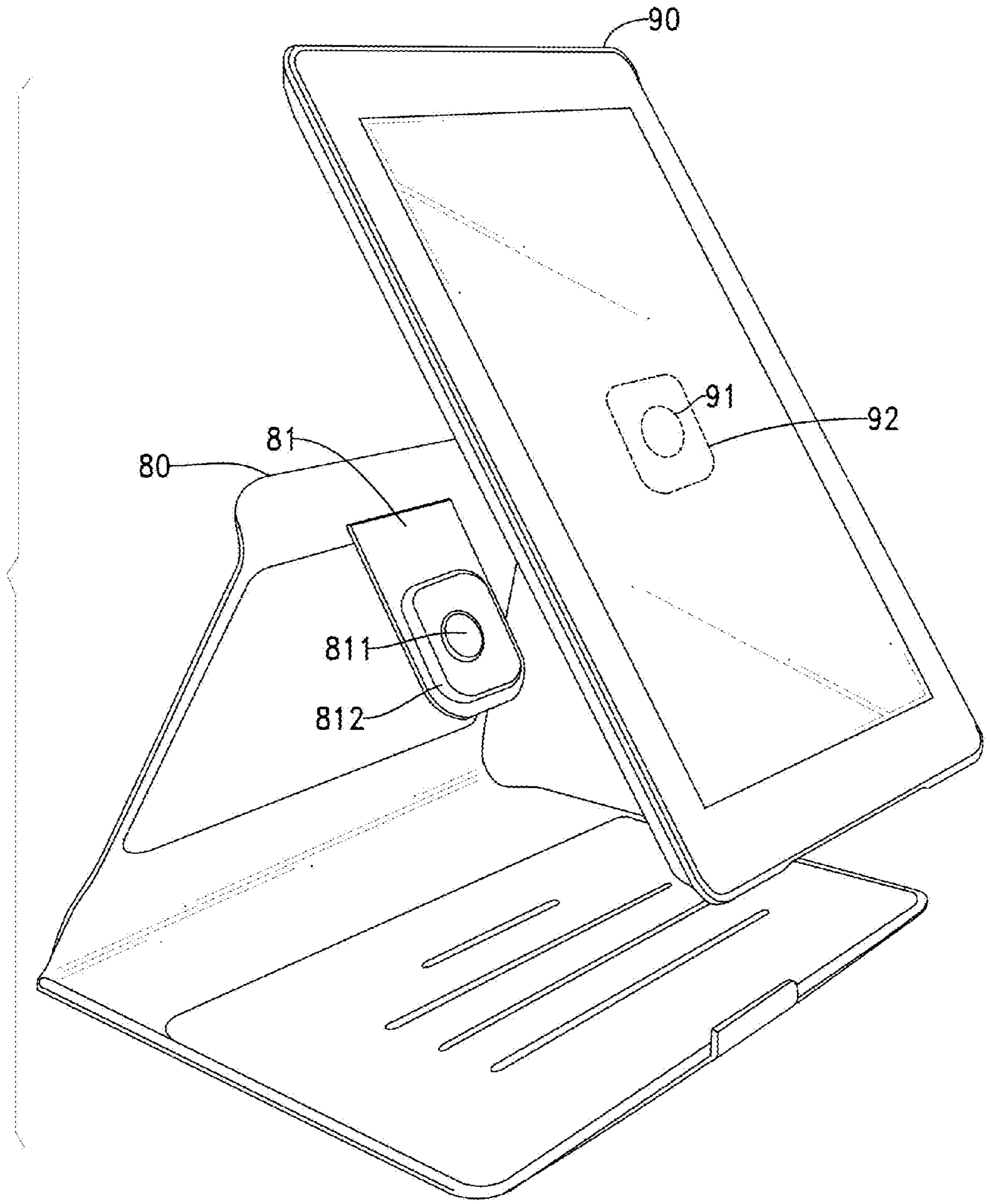
FIG. 26 is a perspective view of the rotating support structure for a portable device in accordance with the prior art.
Figure 27:
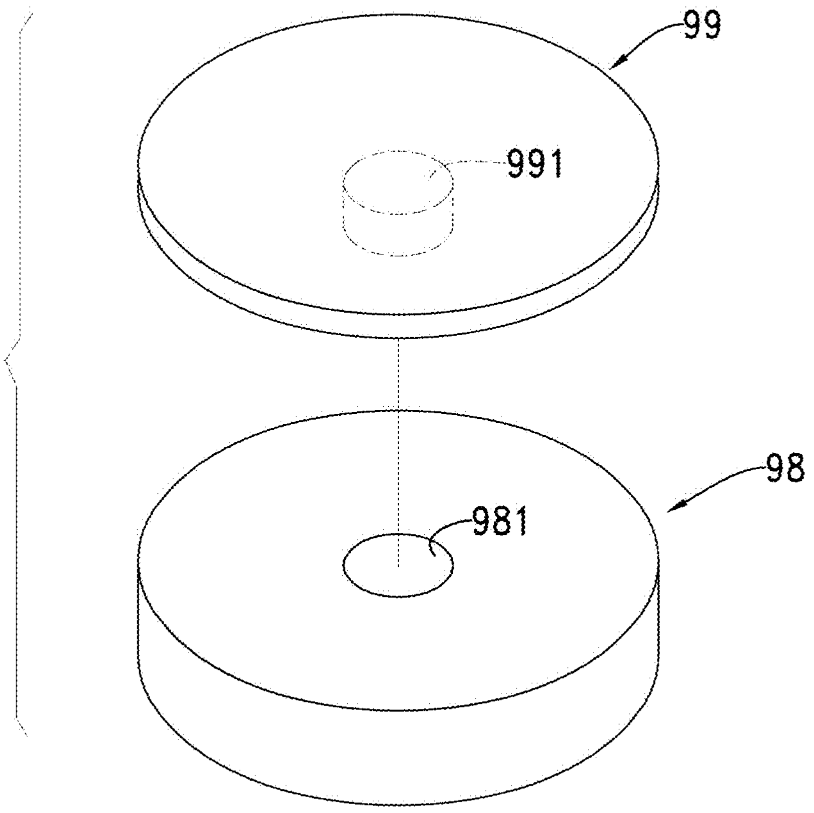
FIG. 27 is a perspective view of another magnetic attraction-fixing assembly in accordance with the prior art.

As shown in FIG. 24, the electronic device 4 is contained in the accessory cover 41, which has a magnetic unit 30 embedded therein, and the accessory cover 41 along with the electronic device 4 is further detachably mounted to the fixture plate 44, which also has a magnetic unit 30 embedded therein. In this embodiment, the fixture plate 44 has contacting area larger enough to enhance the stability of the accessory cover 41 attaching to the fixture plate 44, and preferably the width of the fixture plate 44 (in any direction of the surface contacting the accessory cover 41) is over 60% of the width of the accessory cover 41 (in any direction of the surface contacting the fixture plate 44). Additionally, the contact surfaces of both the accessory cover 41 and the fixture plate 44 are made of rigid material so that any external force exerted on the accessory cover 41 in the direction F may hardly cause the two components to fall apart from each other.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic attraction-fixing assembly, comprising:

two magnetic units, each magnetic unit formed in a flat shape, the two magnetic units stacked with and attracting each other;

wherein each of the magnetic units respectively comprises an inner magnetic component and an outer magnetic component surrounding the inner magnetic component, the inner magnetic component having an inner plane and the outer magnetic component having an outer plane, the inner plane and the outer plane adjacent to and coplanar with each other;

wherein for each magnetic unit, the polarity of the inner plane of the inner magnetic component is opposite to the polarity of the outer plane of the outer magnetic component;

wherein the polarity of the inner plane of the inner magnetic component of one magnetic unit is opposite to the polarity of the inner plane of the inner magnetic component of the other magnetic unit.

2. The magnetic attraction-fixing assembly of claim 1, wherein the inner magnetic component and the outer magnetic component of each magnetic unit are made unitary.

3. The magnetic attraction-fixing assembly of claim 1, wherein the inner magnetic component and the outer magnetic component of each magnetic unit are two separate components attached to each other.

4. The magnetic attraction-fixing assembly of claim 1, wherein the area of the outer plane takes up 10% to 85% of a total area of the inner plane and the outer plane.

5. The magnetic attraction-fixing assembly of claim 4, wherein the area of the outer plane takes up 30% to 50% of the total area of the inner plane and the outer plane for maximum attraction between the two magnetic units.

6. The magnetic attraction-fixing assembly of claim 4, wherein the diameter of the inner plane takes up 38.7% to 94.9% of the diameter of each magnetic unit for maximum attraction between the two magnetic units.

7. The magnetic attraction-fixing assembly of claim 1, wherein the inner magnetic component of each magnetic unit is circular and the outer magnetic component of each magnetic unit is annular around the circular inner magnetic component.

8. The magnetic attraction-fixing assembly of claim 1, wherein the inner magnetic component of each magnetic unit is polygonal or irregular in shape so that the two magnetic units are rotatably configurable in a plurality of stable positions with each other.

9. The magnetic attraction-fixing assembly of claim 8, wherein the inner magnetic component of each magnetic unit is regular polygonal.

10. The magnetic attraction-fixing assembly of claim 1, wherein each magnetic unit is formed in the flat shape with thickness no greater than 3 mm.

11. The magnetic attraction-fixing assembly of claim 1, wherein at least one magnetic unit comprises a plurality of outer magnetic components surrounding the inner magnetic component concentrically and sequentially away from the center of the inner magnetic component, the inner plane coplanar with the outer plane of each outer magnetic component.

12. The magnetic attraction-fixing assembly of claim 11, wherein for the magnetic unit having a plurality of outer magnetic components, the polarity of the inner plane of the inner magnetic component is opposite to the polarity of the outer plane of the outer magnetic component adjacent to the inner magnetic component, and the polarities of the outer planes of each two adjacent outer magnetic components are opposite to each other.

13. The magnetic attraction-fixing assembly of claim 11, wherein at least one from the inner magnetic component and the plurality of outer magnetic components is polygonal in shape so that the two magnetic units are rotatably configurable in one of a plurality of stable positions with each other.

14. A two-piece apparatus with detachability between two components, comprising:

a first component comprising a first magnetic unit formed in a flat shape; and a second component comprising a second magnetic unit formed in a flat shape, the first magnetic unit detachably stacked with and attracting the second magnetic unit so that the first component is detachably attached to the second component;

wherein each of the first magnetic unit and the second magnetic unit respectively comprises an inner magnetic component and an outer magnetic component surrounding the inner magnetic component, the inner magnetic component having an inner plane and the outer magnetic component having an outer plane, the inner plane and the outer plane adjacent to and coplanar with each other;

wherein for each of the first magnetic unit and the second magnetic unit, the polarity of the inner plane of the inner magnetic component is opposite to the polarity of the outer plane of the outer magnetic component;

wherein the polarity of the inner plane of the inner magnetic component of the first magnetic unit is opposite to the polarity of the inner plane of the inner magnetic component of the second magnetic unit.

15. The two-piece apparatus of claim 14, wherein the area of the outer plane takes up 10% to 85% of a total area of the inner plane and the outer plane.

16. The two-piece apparatus of claim 15, wherein the area of the outer plane takes up 30% to 50% of the total area of the inner plane and the outer plane for maximum attraction between the first magnetic unit and the second magnetic unit.

17. The two-piece apparatus of claim 14, wherein the inner magnetic component of each of the first magnetic unit and the second magnetic unit is circular and the outer magnetic component of each magnetic unit is annular around the circular inner magnetic component.

18. The two-piece apparatus of claim 14, wherein the inner magnetic component of each of the first magnetic unit and the second magnetic unit is regular polygonal or irregular in shape so that the first magnetic unit and the second magnetic unit are rotatably configurable in a plurality of stable positions with each other.

19. The two-piece apparatus of claim 14, wherein the first magnetic unit and the second magnetic unit are formed in the flat shape with thickness no greater than 3 mm.

20. The two-piece apparatus of claim 14, wherein at least one of the first magnetic unit and the second magnetic unit comprises a plurality of outer magnetic components surrounding the inner magnetic component concentrically and sequentially away from the center of the inner magnetic component; wherein the inner plane is coplanar with the outer plane of each outer magnetic component and the polarity of the inner plane of the inner magnetic component is opposite to the polarity of the outer plane of the outer magnetic component adjacent to the inner magnetic component, and the polarities of the outer planes of each two adjacent outer magnetic components are opposite to each other.

21. The two-piece apparatus of claim 14, wherein the first component is a mobile phone, a digital camera, or a tablet notebook and the second component is a rotating support structure, a selfie stick, an accessory case, a charging pad, a rechargeable battery, or a fixture plate.

22. A magnetic attraction-fixing assembly, comprising:

two magnetic units, each magnetic unit formed in a rounded flat shape, the two magnetic units stacked with and attracting each other;

wherein each of the magnetic units respectively comprises a circular magnetic component and at least one annular magnetic component around the circular magnetic component, each circular magnetic component comprises a circular plane and each annular magnetic component comprises an annular plane;

the circular plane of each circular magnetic component and the annular plane of each annular magnetic component are located at the same plane, a magnetic pole of the circular plane of the circular magnetic component is an unlike pole to a magnetic pole of the annular plane of the annular magnetic component that is adjacent to the circular magnetic component.

23. The magnetic attraction-fixing assembly of claim 22 wherein each of the magnetic units respectively comprises multiple annular magnetic components, the annular magnetic components surround the circular magnetic component concentrically and sequentially away from the center of the circular magnetic component, the circular plane of the circular magnetic component and the annular planes of the annular magnetic components are located at the same plane; each two adjacent poles of the annular planes of the annular magnetic components are unlike poles.

24. The magnetic attraction-fixing assembly of claim 22, wherein a diameter of the circular magnetic component is smaller than an inner diameter of the annular magnetic component.

25. The magnetic attraction-fixing assembly of claim 23, wherein a diameter of the circular magnetic component is smaller than an inner diameter of the annular magnetic component.

26. The magnetic attraction-fixing assembly of claim 22, wherein the magnetic units further comprise at least one cap which covers one of the magnetic units, and the at least one cap is made of ferromagnetic metal.

27. The magnetic attraction-fixing assembly of claim 23, wherein the magnetic units further comprise at least one cap which covers the magnetic units, and the at least one cap is made of ferromagnetic metal.

28. A rotating support structure for a portable device, comprising:

the magnetic attraction-fixing assembly of claim 22; and a body, comprising:

a bottom comprising a groove and two sides;

a support sheet connected to one side of the bottom;

a carrying sheet connected to the other side of the bottom that is opposite to the side connected to the support sheet, the carrying sheet having a first circular hole, wherein one of the magnetic units is embedded in the first circular hole; and a cover connected to a side of the carrying sheet and having a second circular hole, wherein the other magnetic unit is embedded in the second circular hole.

29. The rotating support structure for a portable device of claim 28, wherein a diameter of the circular magnetic component is smaller than an inner diameter of the annular magnetic component.

30. The rotating support structure for a portable device of claim 28, wherein the magnetic units further comprise at least one cap which covers one of the magnetic units, and the at least one cap is made of ferromagnetic metal.

31. The rotating support structure for a portable device of claim 29, wherein the magnetic units further comprise at least one cap which covers one of the magnetic units, and the at least one cap is made of ferromagnetic metal.

32. The rotating support structure for a portable device of claim 28, wherein diameters of the magnetic units are respectively smaller than a diameter of the first circular hole of the carrying sheet and a diameter of the second circular hole of the cover.

33. The rotating support structure for a portable device of claim 28, wherein a first folding line is disposed on the support sheet and the bottom.

34. The rotating support structure for a portable device of claim 28, wherein a second folding line is disposed on the carrying sheet and the support sheet.

35. The rotating support structure for a portable device of claim 28, wherein the body further comprises a first retaining tab located between the carrying sheet and the cover.

36. The rotating support structure for a portable device of claim 28, wherein the body further comprises a second retaining tab located at a plane of one of the magnetic units that is mounted in the second circular hole of the cover and is opposite to another plane of said magnetic unit that is attracted to the other magnetic unit mounted in the first hole.

* * * * *